July 15, 1958 — W. H. MASHINTER — 2,843,044
METERING PUMP
Filed July 14, 1954 — 4 Sheets-Sheet 1

INVENTOR.
William H. Mashinter,
BY
Wilkinson, Huxley, Byron & Hume
Attys

July 15, 1958 W. H. MASHINTER 2,843,044
METERING PUMP
Filed July 14, 1954 4 Sheets-Sheet 2

INVENTOR.
William H. Mashinter,
BY
Wilkinson, Huxley, Byron & Hume
attys

July 15, 1958 — W. H. MASHINTER — 2,843,044
METERING PUMP
Filed July 14, 1954 — 4 Sheets-Sheet 3
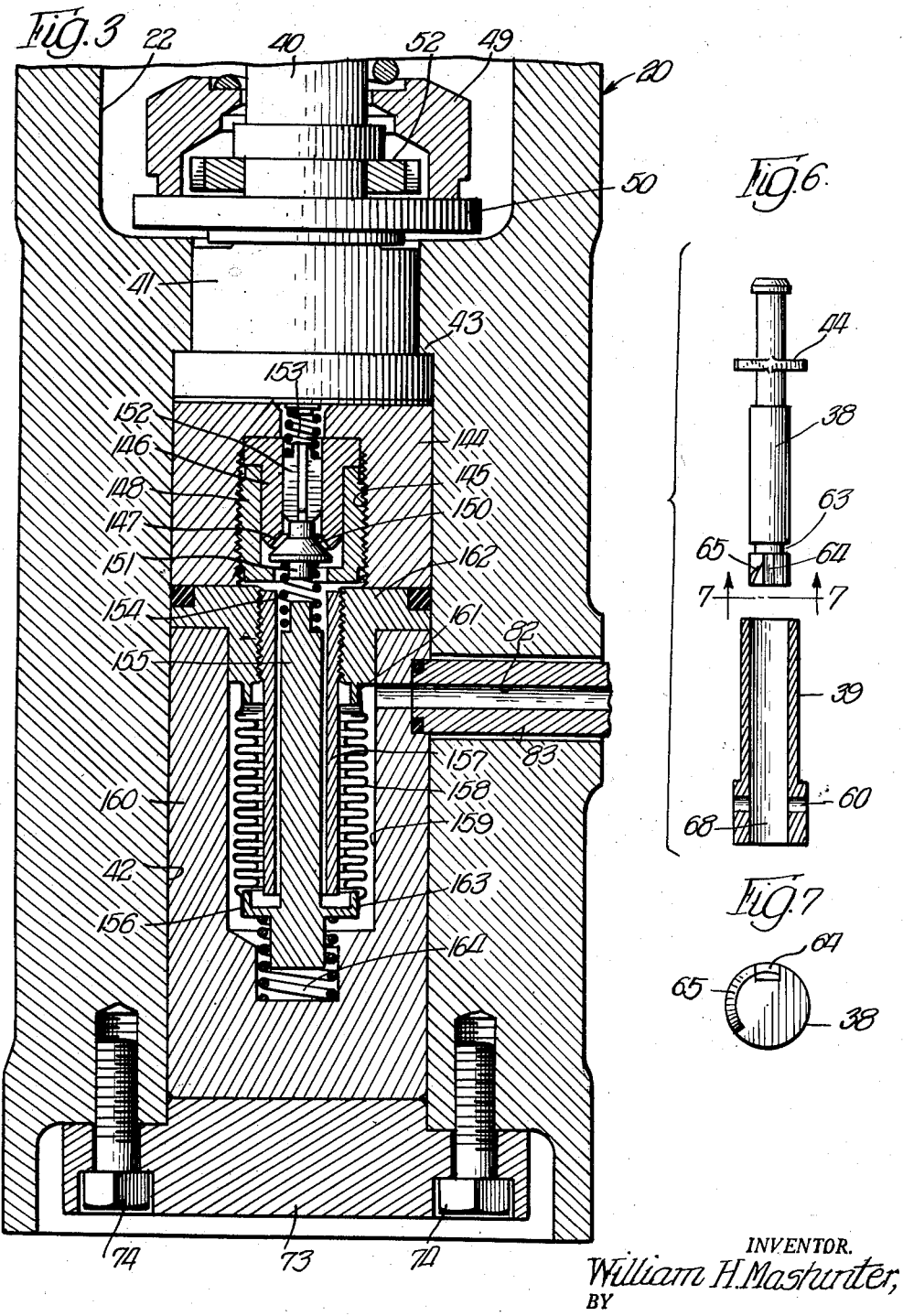
INVENTOR.
William H. Mashinter,
BY July 15, 1958
W. H. MASHINTER
2,843,044
METERING PUMP
Filed July 14, 1954
4 Sheets-Sheet 4
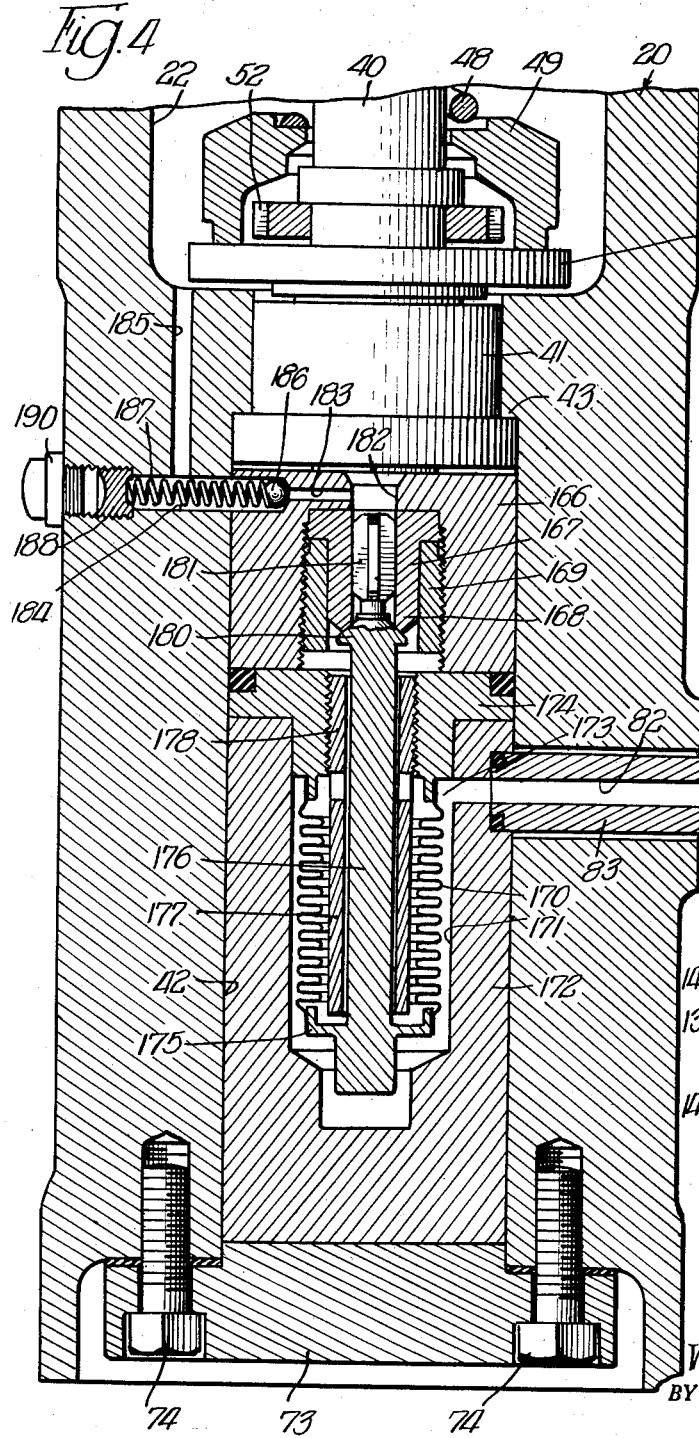
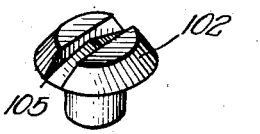
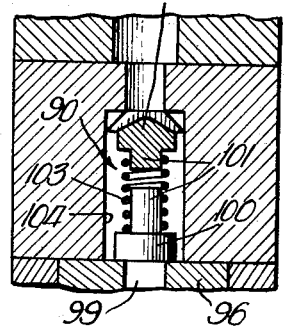
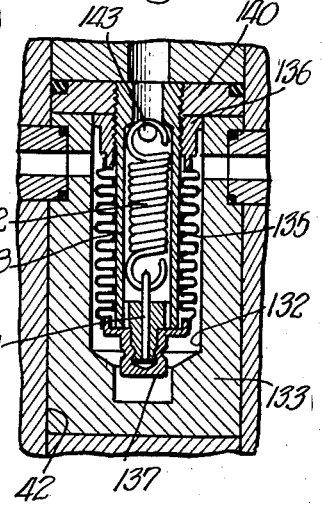
INVENTOR.
William H. Mashinter,
BY United States Patent Office 2,843,044
Patented July 15, 1958

2,843,044

METERING PUMP

William H. Mashinter, Hinsdale, Ill.

Application July 14, 1954, Serial No. 443,251

18 Claims. (Cl. 103—44)

The invention relates to pumps and has reference in particular to a metering pump of packless construction which will accurately and precisely meter fluids including those of a chemical or corrosive nature and other difficult to handle materials at high pressures and over a wide output flow range.

The metering and proportioning pump of the invention is characterized by the complete absence of frictional moving parts or rubbing surfaces in contact with the liquid being pumped and accordingly the pump is ideally suited for pumping and metering such materials as light liquid hydrocarbons, water, liquefied petroleum gases and liquids having particles in suspension. Novel use is made of an hydraulically actuated bellows to provide an hermetically sealed leak-proof pumping element so that stuffing boxes and packing glands have been entirely omitted. Accordingly, these and other structural features have been combined to provide a pump having the pressure producing possibilities of a positive displacement type pump, a pump that can be employed in pumping difficult to handle liquids such as would ordinarily require a diaphragm type of pump, and a pump which can be operated to discharge a continuous flow in the manner of a centrifugal pump.

Another object of the invention is to provide a pump capable of adjustment for pumping a predetermined quantity of liquid in a given time interval, wherein said metering adjustment can be effected while the pump is stationary and also while the pump is operating merely by a light finger pressure on the output control lever, and wherein the metering adjustments for the pump are so accurate that a former flow rate can be precisely obtained merely by resetting the output control lever for that particular flow rate.

A further object is to provide a metering and proportioning pump capable of pumping at a set rate and at excessively high pressures. In fact, the low pressure for the present pump may well constitute the maximum pressure which most centrifugal type pumps are capable of delivering. Also the pump of the invention is able to pump metered quantities from a high pressure source to a low pressure receiver, and it is also possible to close down the operation of the pump with the high pressures remaining on the system.

A still further object is to provide a pump which will have an exceptionally wide output flow range since two features are incorporated in the pump for independently controlling the flow rate. In the first place, the number of pump strokes can be varied by adjusting the speed of rotation of the main drive shaft, and secondly, the quantity per pump stroke can be varied by adjusting the output control lever.

A still further object is to provide a pump of the character described which will incorporate inlet and outlet valves of a flat type having a flat valve member of light weight and having flat valve seating surfaces whereby the valves are quick-acting, positive in seating, and wherein they incorporate a self-cleaning feature which renders the valves especially suited for high pressure pumping and for handling liquids containing particles in suspension.

Further objects in connection with the pump of the invention are to provide a vapor and gas venting mechanism of unique construction, which will permit the venting of air, vapor or gas from the pumping chamber thereof, and to provide a self-contained and adjustable pressure regulating valve by means of which the maximum pump pressure can be controlled.

Another object is to provide a pump such as described wherein the valve assembly is removable from the pump as a unit to facilitate repair and servicing of the pump since the same can be replaced with a spare assembly in a matter of minutes, and wherein the pump is a completely enclosed unit, having operating parts of unique construction and which will require the minimum of maintenance attention.

Another object of the invention is to provide a design of pump wherein those parts which must be made of special alloys have been reduced to a minimum, the said parts comprising those making up the pumping assembly, and which are either difficult to machine or fabricate or are otherwise expensive since they contact the liquid to be pumped.

Another object is to provide a pump wherein precise volume control is obtained through actuation of a volume control lever and which is freely movable so that, following manual actuation, the same can be locked to the pump housing and held stationary. However, it is also possible to actuate said control lever from remote and automatic indicating devices whereby a proportional flow can be secured in relation to a measured variable primary flow from which the pump receives its governing signal.

Another object is to provide a pump as described wherein all elements are enclosed within the pump housing, thereby sealing the same from atmospheric contamination and corrosion and which additionally assures positive and continuous lubrication of the operating parts and also eliminates exposed linkages and similar mechanism.

A further object is to provide a pump as described wherein a plurality of such units can also be mounted on a base and driven from a common drive shaft, and although each pump unit handles its own fluid, nevertheless individual adjustment of each pump can be effected to accomplish simultaneous proportioning and ratio control for the corresponding plurality of fluids.

With these and various other objects in view, the invention may consist of certain novel features of construction and operation as will be more fully described and particularly pointed out in the specification, drawings and claims appended thereto.

In the drawings, which illustrate an embodiment of the invention, and wherein like reference characters are used to designate like parts—

Figure 3 is a fragmentary vertical sectional view illustrating another modification of pump coming within the invention, the downhill valve thereof being shown in open position;

Figure 4 is a fragmentary vertical sectional view of a modification basically similar to Figure 3, but illustrating the structural details of a pressure regulating valve such as may be applied thereto, and showing another form of a downhill valve in closed position;

Figure 5 is a fragmentary sectional view illustrating in detail a further modification of pump design coming within the invention;

Figure 6 is an exploded view of the metering plunger and its barrel, the plunger being shown in elevation, and the barrel in vertical section;

Figure 7 is a bottom plan view taken substantially along line 7—7 of Figure 6 showing the slot and the inclined helical ramp formed on this end of the plunger;

Figure 8 is an exploded view showing details of one of the inlet and outlet valves with parts thereof being shown in section;

Figure 9 is a vertical sectional view taken through one of the inlet and outlet valves and illustrating the association of the parts when assembled;

Figure 10 is a perspective view of the spring seat of the spring-loaded discharge valve for the outlet;

Figure 11 is a vertical sectional view showing constructional features of said spring-loaded discharge valve.

Figure 1:
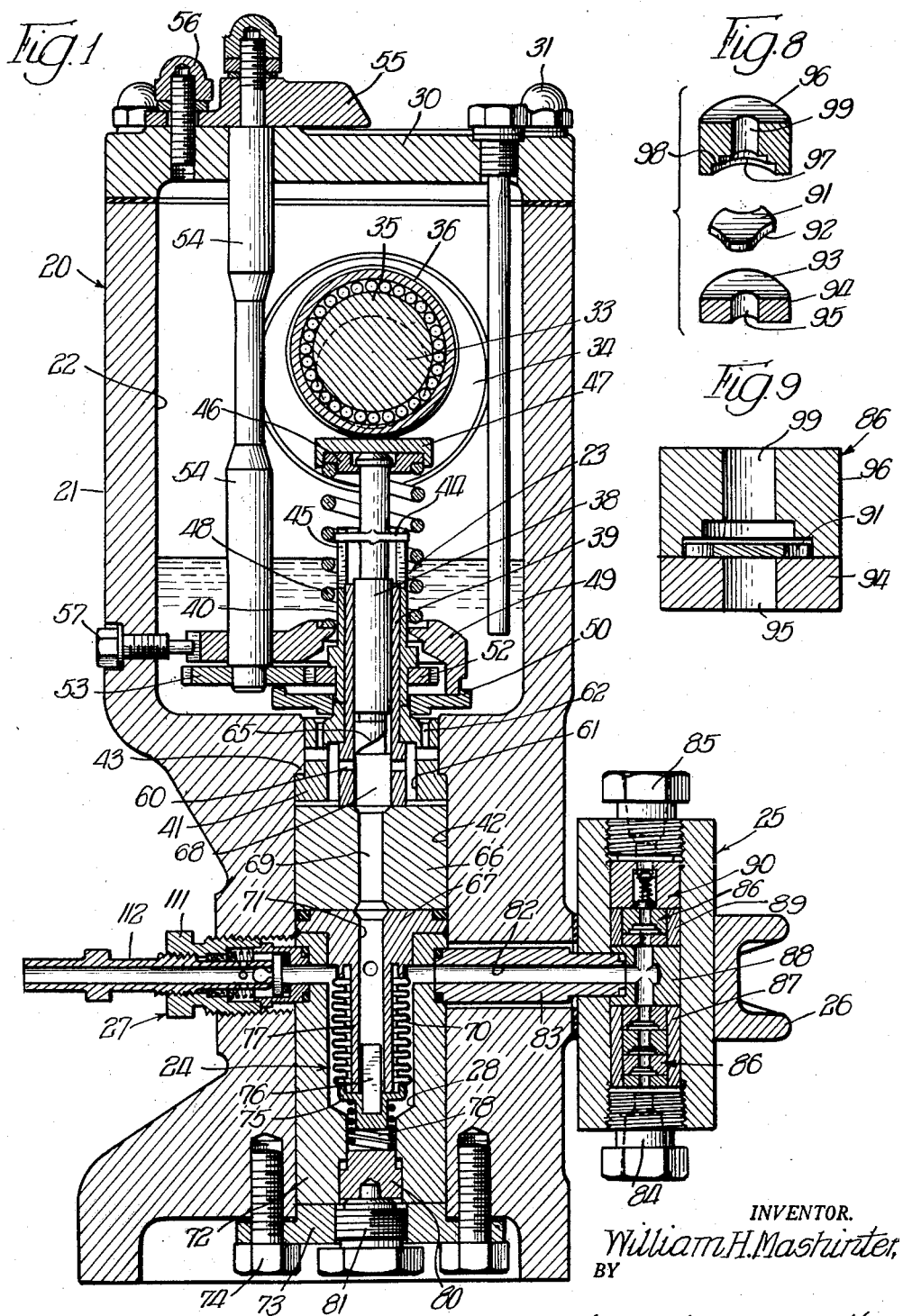
Figure 1 is a vertical sectional view taken substantially through the center of a metering pump constructed in accordance with the present invention.

Referring first of all to Figure 1, the invention is embodied in a pump indicated in its entirety by numeral 20 and which includes a housing 21 generally cylindrical in shape, having an oil reservoir chamber 22 and a plunger pumping assembly 23 located within the upper portion of the housing and having a bellows pumping assembly 24 incorporated in the lower portion of the housing. A third assembly 25 provides the inlet and outlet valves for the pump and this assembly is releasably secured to the lower portion of the pump housing by the retaining member 26 which thereby permits removal of the inlet and outlet valve unit for speedy servicing of the pump. Said lower portion of the housing approximately opposite the valve unit 25 has a gas and vapor venting device 27 threaded in the wall thereof and which when opened will functionally coact with the bellows pumping chamber 28 to release gas and vapor therefrom in a manner which will be explained in detail as the description proceeds. The oil reservoir chamber 22 may contain a quantity of oil to a level as indicated, and said chamber is closed by top plate 30 suitably secured to the housing by the cap screws 31.

The drive shaft for the pump indicated by numeral 33 extends through opposed side walls of the oil reservoir chamber, being suitably journalled in said walls by the ballbearing assemblies 34 and between said assemblies the shaft is provided with an eccentric lobe 35 on which is mounted a roller bearing assembly having an outer race 36. The plunger pumping assembly 23 is disposed vertically within oil reservoir chamber 22 and the same essentially consists of a metering plunger 38, the barrel 39, sleeve 40 and barrel retainer 41. The barrel retainer is inserted within bore 42 from the base end of the housing and is positioned by contact with shoulder 43. The barrel 39 extends upward through the retainer, being in turn positioned and held thereby in vertical relation within the oil reservoir chamber. The metering plunger 38 is adapted to reciprocate within the barrel 39, and it will be observed that the plunger is provided with ears 44 disposed adjacent the upper end thereof and which are adapted to ride in the slots 45 formed in the upper end of the sleeve 40. As a result any rotation imparted to sleeve 40 is directly transmitted to the plunger. The top terminal end of the plunger is provided with an upper spring seat 46 and with the tappet 47, said tappet being held in contact with the race 36 on the eccentric lobe by the coil spring 48, which is confined between the upper spring seat 46 and the lower spring seat 49. The action of the coil spring is to maintain the plunger in elevated position with the tappet up against the said eccentric. The lower spring seat 49 is supported and positioned by the spring seat support 50 and within the space provided by these elements there is located the pinion 52 which is fixed to sleeve 40. Gear 53 has meshing relation with pinion 52 and said gear is rotated by the quantity control shaft 54 journalled at its lower end by the lower spring seat 49 and at its upper end by the top plate 30 with the portion of the shaft which projects above the top plate having the indicator 55 suitably fixed thereto. The lock nut 56 can be employed to lock the indicator and associated parts in adjusted metering position, whereas the lock screw 57 is associated with the lower spring seat 49 to prevent rotation of said spring seat.

The reciprocating movements of the plunger 38 function to apply hydraulic pulsations to the bellows assembly, for which purpose the barrel 39 is provided with one or more ports such as 60 leading to a chamber such as 61, provided by the barrel retainer 41, and which chamber surrounds the barrel at this lower end thereof. The vertical passages 62 lead upwardly from chamber 61 and connect with the oil reservoir chamber 22. As a result the oil from the reservoir may flow downwardly through passages 62 into chamber 61 and through the port or ports 60 to within the barrel 39 so that the end of the plunger may have pumping action thereon. As best shown in Figure 6, the plunger is provided with the annular groove 63, with the vertical slot 64, and with the inclined helical ramp 65, the latter making it possible to vary the quantity of oil acted on by the plunger by adjusting its rotative position with respect to the port or ports 60. The ramp of the plunger need not necessarily have a helical inclination as other configurations may be resorted to, depending on the pumping characteristics desired of the plunger. Also the ramp may be referred to as the scroll surface of the helix and by rotation of the quantity control shaft 54 the sleeve 40 may be rotated to secure any desired rotative position of the plunger, all in a manner which at the same time permits free reciprocating movement of said plunger for producing the hydraulic pulsations as described.

The spacing member 66 is located within bore 42 between the barrel retainer 41 and the upper bellows closure 67, the member having the bore 69 therein in alignment with the bore 68 of the barrel, and the closure 67 having the flexible bellows 70 hermetically sealed thereto and depending therefrom into the pumping chamber 28. The bellows constitutes the pumping element of the present device and the same is capable of withstanding very high hydraulic pressures and at the same time having expanding and contracting movements to vary the volumetric capacity of the pumping chamber. The bore 71 completes the connection from the barrel to within the bellows. The said pumping chamber 28 is formed in the member 72 which is locked within bore 42 of the housing by the bottom plate 73 held in place by the bolts 74. Thus the member 72, the upper bellows closure 67 which may be welded to member 72, the spacer 66 and the barrel retainer 41 are held in vertical alignment within bore 42, with the interior of the bellows 70 having communication with the metering plunger 38 through the aligned bores or passages 68, 69 and 71. The bellows 70 is closed by the lower bellows closure 75 having the upstanding stem 76 located within the bellows and which fits within the bellows guide 77. The bellows return spring 78 is confined between the lower bellows closure 75 and the plug 80 held in place by nut 81.

All the space within the bellows 70 and including passages 68, 69 and 71 to the plunger 38 will be filled with oil from the reservoir 22 and upon a downward stroke of the plunger a quantity of oil, depending on the rotative position of the plunger, will be trapped below the ports 60 and compressed by the plunger to expand the bellows 70, thus producing a pumping stroke. On upward movement of the plunger the pressure on the oil will be released and the bellows will return under the tension of spring 78 to effect a suction stroke. Thus the hydraulic pulsations produced by the plunger 38 operating on the oil within the bellows will cause alternate pumping and suction strokes of the bellows within chamber 28 and accordingly a liquid can be pumped by this action of the bellows. The pumping chamber 28 is connected by passage 82 extending through spacer 83, with the valve unit 25 having the threaded inlet connection 84 and the threaded outlet connection 85.

A plurality of inlet valves 86, such as shown in Figures 8 and 9, are located within the sleeve 87 below the center member 88 and these in combination comprise the valved inlet of the pump. One or more of such valves are similarly located within sleeve 89 above the center member 88, and the same in combination with the spring-loaded discharge valve 90, Figure 11, comprise the valved outlet of the pump. The valve 86 of Figures 8 and 9 is of the fast-acting type, and consists of a flat valve member 91 of light weight having a shape formed by the scalloped edges 92, as shown, and which is supported on the flat surface 93 of the base 94 directly over the passage 95 therein so as to control the opening and closing of said passage. The cage 96 is also supported on the base 94 and the valve member 91 is enclosed within the space formed by the stepped surfaces 97, the shoulder 98 thereof limiting the upward movement of the valve member. For the inlet valves of the pump of Figure 1 a complete valve assembly 86 is employed in addition to two cages 96 which are superimposed thereon. For the outlet valves of said pump one complete valve assembly 86 is employed in combination with the spring-loaded valve assembly 90. Said last mentioned valve assembly, shown in detail in Figures 10 and 11, includes a valve member 100 and a grooved spring seat 102, each element having a stem 101 which guides and positions the coil spring 103, confined between and coacting with said member and head. On an expansion stroke of the bellows the inlet valves close, whereas the outlet valves are caused to open. A quantity of liquid is forced up against the valve member 100, causing the member to lift against the compression of spring 103 and liquid escapes into chamber 104 to eventually flow through grooves 105 of the spring seat, whereupon it is discharged into the outlet connection of the pump. The stems 101 formed on the valve member and knob head, respectively, are provided in order to prevent collapsing action of the coil spring 103 to an extent where the convolutions would engage and effect a permanent set of the spring.

Figure 12:
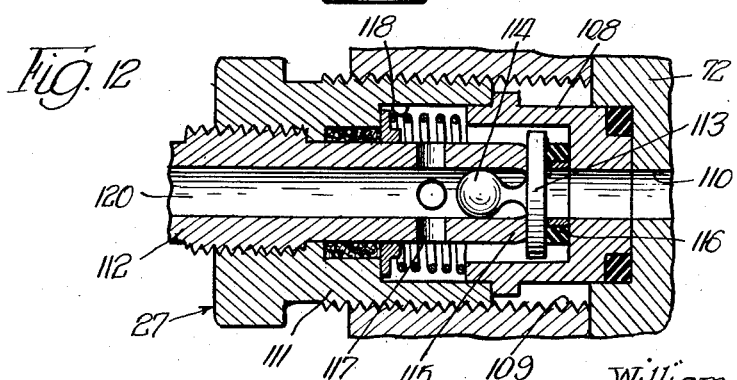
Figure 12 is a fragmentary detail sectional view showing the venting valve assembly of the pump, with the venting valve member being shown in closed position.

On initial starting up of the pump, the high pressure chamber 28 and connecting passages leading to the inlet and outlet valves must be completely vented of air, gas and vapor. To efficiently and effectively accomplish this function the invention provides the venting device 27 which is shown in enlarged section in Figure 12. The tubular valve seat member 108 is located within the threaded recess 109 in alignment with passage 110 leading to the pumping chamber 28. The tubular retaining nut 111 is threaded in the recess and it holds the seat member in place. The bleeder tube 112 is in turn threaded in the retainer nut 111 and by means of a ball and socket connection the bleeder valve 113 is loosely fixed to the inner end thereof, the valve having the ball 114 formed integral therewith, whereas the adjacent end of the bleeder tube is peened to form the socket 115. A resilient washer 116, formed of "Teflon" (a poly-tetra-fluoroethylene plastic) or any other suitable material, is located between the valve and the seat provided therefor by member 108. The openings 117 connect the chamber 118 with the passage 120 of the tube. When the tube is retracted by rotating the same a prescribed number of turns in a releasing direction, the valve 113 is accordingly released to thus open the venting passages and some of the gas or vapors within chamber 28 can escape on each pumping stroke of the bellows. However, on a suction stroke the valve 113 will automatically close, being drawn shut by the suction effect, and which is permitted by the measured play incorporated in the ball and socket connection. Otherwise atmospheric air would be drawn into the pumping chamber instead of the liquid to be pumped. Eventually all gas and vapor will be vented from the pumping chamber and the same will be full of liquid which will thereafter be discharged from the bleeder tube. This is an indication for the operator to close the venting valve 113 against its plastic seat, whereupon the pump will discharge liquid from the outlet 85.

On the down stroke of the plunger 38 the pumping action thereof does not become effective until the scroll surface of the helix 65 has passed the port or ports 60. From there on the plunger will act on the oil below the same to produce an expansion of the bellows 70. The extent to which the bellows may be caused to expand will therefore depend on the rotative position of the plunger. The quantity of liquid acted on per stroke can be varied from zero to maximum and a further control of the delivery rate of the pump can be effected by adjusting the speed of rotation of the drive shaft. When two ports such as 60 are provided the zero position for the plunger is effected when the slot 64 is aligned with either port. Thus the pump has a zero position at both ends of the quadrant. The ease with which the plunger can be rotatively adjusted is a further outstanding feature of the present pump since any desired flow rate from zero to full capacity can be obtained while the pump is stationary or while the pump is running merely by exerting a light finger pressure on the output control lever. Also the present pump is characterized by a pumping element in the form of a sealed, leak-proof bellows and said bellows together with its return spring are the only elements coming in contact with the liquid. The complete absence of frictional moving parts as regards the pumping instrumentalities is a particularly important asset. In addition thereto the reagent head and bellows may be quickly and easily removed and a new one installed, thus facilitating the job of repairing and maintaining the pump in operating condition. The pump also has an easily serviced valve assembly in the unit 25 since the same can be removed in a matter of minutes and replaced with a complete unit properly calibrated. The spare assembly can then be serviced at the operator's leisure. The flat type valve of Figures 8 and 9 requires less effort to be fully opened than any other type and the horizontal wash action which takes place across both faces is a self-cleaning feature which accounts in a large measure for the high efficiency of the pump when operating on liquids having particles in suspension.

Figure 2:
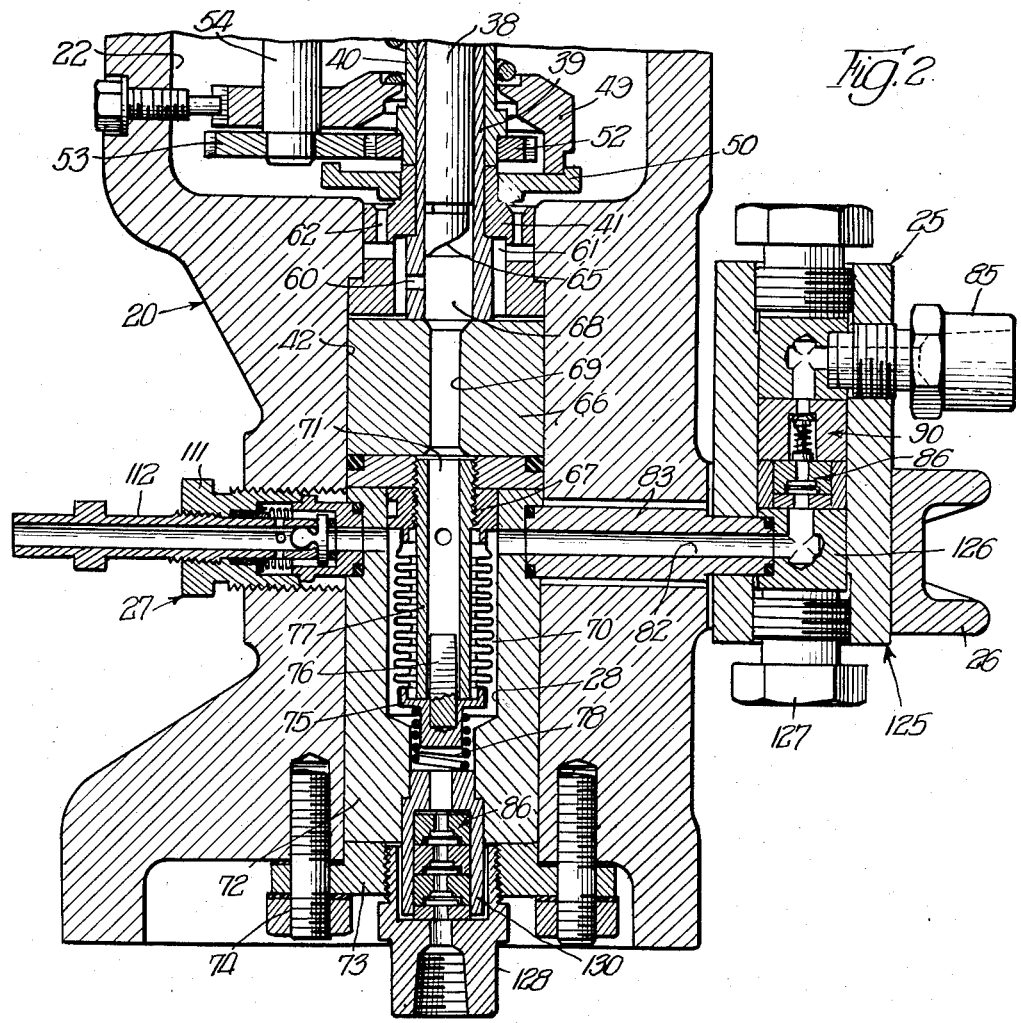
Figure 2 is a fragmentary vertical sectional view through the lower portion of a pump such as shown in Figure 1 illustrating, however, a modification wherein the inlet valves are located in the base of the pump in direct association with the pumping chamber thereof.

In the modification of Figure 2 the inlet valves for the pump have been removed from the unit 125 and said valves have been located directly below the pumping chamber 28. With this exception all the structural features of the pump of Figure 1 have been repeated. As shown in Figure 2, the outlet valve unit 125 includes a center member 126 having an outlet passage of elbow shape therein. The valved outlet is formed by the flat type valve assembly 86 in combination with the spring-loaded outlet valve 90. The threaded plug 127 closes the opposite end of the unit and holds the center member and said associated parts in place. The inlet connection 128 is threaded into the bottom plate 73 and said connection retains the sleeve 130 against a shoulder provided by member 72. The flat type valves 86 are located within sleeve 130 and said sleeve additionally provides the support for the return spring 78. Accordingly, upon operation of the pump of Figure 2 the liquid to be pumped is delivered by a supply line connecting with 128 and an increment of liquid is admitted by the inlet valves on each suction stroke of the bellows 70. The liquid thus entering the pumping chamber is caused to flow through the same and through the connecting passages to the outlet valves for discharge from the pump. As a result of this flow it is possible to keep the pumping chamber clean, whereas in the pump of Figure 1 the chamber 28 could accumulate sludge particles which might partially fill the chamber, which situation, of course, would be highly undesirable as the sludge accumulation might in time interfere with pumping pulsations of the bellows. Thus for pumping liquids having particles in suspension the pump of Figure 2 would be preferred.

In the pumping of certain chemicals and liquids of this nature it is desirable to eliminate contact thereof with the return spring 78 as embodied in the pumps of Figures 1 and 2. Figure 5 illustrates a modification wherein the return spring for the bellows is located within the bellows and is accordingly immersed in oil at all times. In said modification the pumping chamber 132 is provided by member 133, located within the bore 42 of the pump. The bellows 135 has location within said pumping chamber 132 and the upper end of said bellows is hermetically sealed to the upper closure member 136. The bottom of the bellows is closed by the lower closure member 137 and the bellows guide 138 extends upwardly within the bellows for threaded connection with the upper bellows closure 136 and the member 140. The pin 141 extends upwardly from the bottom closure member to within the bellows guide and has connection with the return spring 142 which is held at its opposite upper end by the pin 143, which extends transversely of the bellows guide. The action of the return spring 142, as regards the modification of Figure 5, is the same as that of the return spring 78, previously described in connection with Figures 1 and 2. On an expansion stroke of the bellows the return spring 142 will elongate, permitting elongation of the bellows to effect a pumping of the liquid through the outlet valves of the pump. The length of the bellows guide 138 determines the collapsed postion of the bellows 135, and in this position thereof the return spring 142 may be almost collapsed.

It is also possible for the pump of the invention to accurately meter from a high pressure source of liquid "down-hill" into a low pressure receiver. However, in order to secure this mode of operation a unique valve mechanism is provided within the oil passages leading to the bellows and which may be designated a downhill valve in order to distinguish the same from the other valve arrangements employed in the pump. Referring more particularly to Figure 3, the modification there disclosed consists of a pump housing 20 having incorporated therein a drive shaft, a metering pluger, barrel, barrel retainer, and a quantity control shaft, all as described in connection with Figure 1. The structure below the barrel retainer 41, having location within bore 42, constitutes the special elements which have been provided in connection with the downhill valve. The spacing element 144 has the interiorly threaded bore 145 formed therein, the same opening from the bottom of the member and in which is located the tubular valve seat member 146 providing the valve seat 147. The member 146 is retained within bore 145 by the retaining member 148. The downhill valve indicated by numeral 150 has formed integral therewith a depending pin 151 and an upstanding guide stem 152, the latter having the shape of a cross in section so that oil may flow through the peripheral passages thus provided. The upper coil spring 153 has contact with the valve stem 152 to resiliently bias the valve 150 in a downward or opening direction. However, the lower coil spring 154 is somewhat stronger than spring 153 so that the same is overpowered and the valve 150 is normally maintained closed against its seat 147. The spring 154 is confined between the valve 150 and the guide stem 155 which projects upwardly from the lower bellows closure 156 having location within the bellows guide 157. The bellows 158, as shown in this modification, is located within the pumping chamber 159 formed within the member 160 and said bellows is hermetically sealed at 161 to the upper bellows closure 162 and is likewise hermetically sealed at 163 to the lower bellows closure 156. In this respect the bellows structure shown in Figures 1 and 2 is substantially similar. The bellows guide 157 has threaded securement at its upper end with the upper bellows closure 162 and it will be seen that the length of the guide will determine the collapsed condition of the bellows since the lower closure 156 is adapted to contact the guide on each suction stroke as a result of the tension exerted by the coil spring 164.

Since the pump of Figure 3 is designed for operation on liquids at a high pressure, it will therefore be understood that an equivalent pressure must be maintained at all times on the oil within the bellows 158 or the same would collapse. This equivalent pressure is maintained within the bellows 158 by the valve 150. On each downward stroke of the metering plunger 38 of the pump, the oil below the same and within the passages leading to within the bellows will be compressed as heretofore explained, and the result of this hydraulic pressure above valve 150 will be to cause the valve to open and assume a position as shown in Figure 3. The hydraulic pressure on the oil is thus transmitted to the oil within the bellows and an expansion stroke of the bellows accordingly takes place. This expansion stroke of the bellows will effect discharge of an increment of liquid from the pump and thereafter as the metering plunger returns on its up stroke the pressure on the oil within the bellows will be progressively decreased. Under the tension of the return spring 164 the bellows will tend to collapse and the oil will flow upwardly past valve 150 until the suction stroke is substantially completed. At all times equivalent pressures have been maintained within and outside the bellows 158 and such a condition exists when the suction stroke is terminated and the downhill valve completely closes. Therefore during the suction stroke when high pressure liquid is admitted and also on the pumping stroke the internal pressure within the bellows is at least equal to that exteriorly of the bellows so as to prevent the bellows from collapsing.

In the modification of the downhill valve assembly as shown in Figure 4 the tubular spacing member 166 receives and positions the valve seat member 167 providing the valve seat 168 and which is held in place by the threaded retainer 169. The bellows 170 has location within the pumping chamber 171 provided by member 172 and the upper end of said bellows is hermetically sealed at 173 to the upper bellows closure 174. The said bellows is closed at its lower end by the lower bellows closure 175, the said closure having formed integral therewith the upstanding guide stem 176 which extends through the bellows guide 177 to project beyond the upper threaded end 179 of the bellows guide. The downhill valve 180 is formed on the upper projecting end of stem 176 and said valve contacts valve seat 168 when the bellows 170 is in collapsed condition. The top guiding portion 181 for the downhill valve has location within the passage provided by seat member 167 and said portion has the shape of a cross in section so that liquid may flow through the peripheral spaces thus provided in producing the hydraulic pulsations which are communicated to the bellows 170 for pumping as has been described. The downhill valve 180 of Figure 4 operates in a manner similar to the valve as explained in connection with Figure 3, the only structural change residing in the fact that the valve is directly connected through the guide stem 176 to the lower bellows closure 175 and thus to the bellows 170. Accordingly, the coil springs for the valve and the return spring for the bellows have been eliminated. When the metering plunger 38 of the pump is reciprocated the hydraulic pulsations will be applied in a manner as described to the bellows 170 since the downhill valve 180 will open and close in synchronism with the pressure producing strokes of the plunger. Thus the oil within bellows 170 is maintained at a high pressure at all times and which will at least equal the liquid pressures within the pumping chamber exteriorly of the bellows. As a result bellows 170 is prevented from collapsing and the same will operate efficiently to accurately pump metered quantities of liquid received from a high pressure source to a low pressure receiver.

Another feature of the present pump resides in the provision of a pressure regulating valve, an embodiment of which has been shown in connection with the modification of Figure 4. The valve is completely retained within the pump, although it is accessible from the exterior for adjustment and for repair purposes. Referring in particular to Figure 4, it will be seen that the passage 182 in the spacing member 166, which is in communication with the metering plunger 38 of the pump, is suitably connected by means of the bore 183 with the recess 184 which in turn has communication through the bypass connection 185 with the oil reservoir chamber 22. Thus the oil from passage 182 can be returned to the reservoir through bore 183, recess 184 and bypass connection 185. However, in accordance with the invention, the bore 183 is normally closed by the ball 186 held in contact with its seat by coil spring 187 and which, in combination, comprises the pressure regulating valve for the pump. The tension applied by coil spring 187 can be adjusted by the set screw 188 having location within its threaded recess and which recess may be closed by the cap nut 190. On a down pumping stroke of the metering plunger 38 the oil below the same, and which fills the bellows and the passages leading thereto, is compressed to a high degree to produce an expansion of the bellows, all in a manner as described. The pressure regulating valve functions to control the maximum pressure to which the oil within the bellows may be subjected and thus the maximum expansion of the bellows so that its maximum pumping stroke can be controlled. Should the oil within passage 182 exceed the predetermined maximum pressure, the ball 186 will be caused to open, allowing the oil to escape into recess 184. When the high pressure within passage 182 has thus been relieved the ball 186 will close again against its seat. The pressure at which the ball 186 will open can be adjusted by rotation of the set screw 188 which regulates the tension applied by coil spring 187. The pressure regulating valve is particularly useful in connection with the present pump since the maximum output pressure of the pump can thus be controlled.

The pump of the invention is a completely enclosed unit with the frictional sliding parts of the pump comprising the pulsating plunger having operation in oil for its continuous lubrication and wherein the pumping element, in the form of a flexible bellows, is an hermetically sealed leakproof unit and is hydraulically pulsated so that the discharge rate of the pump can be varied merely by adjusting the extent of the pulsations of said bellows. The downhill valve assembly constitutes an important feature and the same has contributed in a large measure to the success of the present pump in its many applications. During operation of the pump and during non-operating periods thereof liquid pressures within the pumping chamber may reach a high value, but nevertheless a balancing of the hydrostatic pressures interiorly and exteriorly of the bellows will be maintained by operation of the downhill valve. Accordingly, it is possible to shut down the pump with high pressures remaining on the system either on the inlet end or on the outlet end. It is also possible for the present pump when equipped with the downhill valve to receive liquid from a high pressure source and to deliver the same to a low pressure receiver.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:
1. In a pump, the combination with a housing having a cylindrical recess providing a pumping chamber therein, an inlet for said chamber, an outlet for the chamber, a reservoir chamber provided by the housing and located above the pumping chamber, a vertically disposed passage in the housing extending between the reservoir chamber and the pumping chamber for connecting the same, a pumping element within the pumping chamber in the form of a flexible bellows having a bottom closure member and an open top end, said bellows being capable of longitudinal expanding and contracting movements to vary the volumetric capacity of the pumping chamber, the open end of said bellows being hermetically sealed to the housing walls in surrounding relation with the said passage at the top end of the pumping chamber, whereby the passage connects the interior of the bellows with the reservoir chamber so that liquid in the reservoir chamber may completely fill the passage and said bellows, and means subjecting the liquid within the bellows to hydraulic pulsations to cause the bellows to alternately expand and contract, whereby as the volumetric capacity of the pumping chamber is varied a fluid can be drawn through the inlet and discharged through the outlet, said inlet and outlet each incorporating a valve assembly including a base having a center passage and which provides a flat valve seating top surface, a cage also having a center passage and which is supported on the flat top surface of the base with the passages in alignment, and a valve member comprising a flat disc having location within a recess provided by the cage, said valve member having seating contact on the flat top surface of the base to close the valve assembly, and said valve member lifting to an extent as permitted by the recess to open the valve assembly permitting a liquid to flow through the aligned passages.

2. In a pump, the combination with a housing having a pumping chamber in the lower portion thereof, a reservoir chamber in the upper portion and having a connecting passage therebetween, an inlet for the pumping chamber, an outlet for the pumping chamber, a pumping element within the pumping chamber in the form of a flexible bellows closed at its bottom end and open at its top end, said bellows being capable of longitudinal expanding and contracting movements to vary the volumetric capacity of the pumping chamber, the open end of said bellows being hermetically sealed to the housing walls in surrounding relation with said passage at the top end of the pumping chamber, whereby the passage connects the interior of the bellows with the reservoir chamber so that liquid in the reservoir chamber may completely fill the passage and said bellows, reciprocating means located within the reservoir chamber for subjecting the liquid in the passage and within the bellows to hydraulic pulsations to cause the bellows to alternately expand and contract, whereby as the volumetric capacity of the pumping chamber is varied a fluid can be drawn in through the inlet and discharged through the outlet, and other means operatively associated with the reciprocating means for adjusting the effective pumping stroke of said reciprocating means to vary the magnitude of the hydraulic pulsations and thus the discharge rate of said pump, said inlet and outlet each incorporating a valve assembly including a base having a center passage and which provides a flat valve seating surface, a cage also having a center passage and which is supported on the flat top surface of the base with the passages in alignment, and a valve member comprising a flat disc having location within a recess provided by the cage, said valve member having seating contact on the flat top surface of the base to close the valve assembly, and said valve member lifting to an extent as permitted by the recess to open the valve assembly permitting a liquid to flow through the aligned passages.

3. In a pump, the combination with a housing having a pumping chamber in the lower portion thereof, a reservoir chamber in the upper portion and having a connecting passage therebetween, a valved inlet for the pumping chamber, a valved outlet for the pumping chamber, a flexible bellows depending within the pumping chamber and having its open top end hermetically sealed to the housing walls in surrounding relation with the passage at the top end of the pumping chamber, reciprocating means located within the reservoir chamber for subjecting the liquid in the passage and within the bellows to hydraulic pulsations whereby to alternately expand and contract the bellows and produce pumping strokes thereof, said housing providing a vent opening for the chamber, a venting valve for closing said vent opening, and a bleeder tube having an adjustable threaded relation with the housing, said tube having a loose ball and socket connection with the venting valve, whereby when the valve is open it will permit escape of air, gas and vapor from the pumping chamber on an expansion stroke of the bellows and will automatically close when the bellows contracts to prevent the entrance of atmospheric air to within the pumping chamber.

4. In a pump, the combination with a housing having a pumping chamber in the lower portion thereof, a reservoir chamber in the upper portion and having a connecting passage therebetween, a valved inlet for the pumping chamber, a valved outlet for the pumping chamber, a flexible bellows depending within the pumping chamber and having its top open end hermetically sealed to the housing walls in surrounding relation with the passage at the top end of the pumping chamber, a reciprocating metering plunger located within the reservoir chamber for subjecting the liquid in the passage and within the bellows to hydraulic pulsations whereby to alternately expand and contract the bellows and produce pumping strokes thereof, other means operatively associated with the metering plunger for adjusting the effective pumping stroke of the plunger to vary the magnitude of the hydraulic pulsations and thus the discharge rate of the pump, a return spring for the bellows for yieldingly biasing the bellows to cause the same to contract, and a downhill valve within the passage having an opening movement in a direction inwardly of the bellows, whereby said valve controls flow of liquid into and from the bellows to maintain a balancing of the hydraulic pressures interiorly and exteriorly of the bellows.

5. In a pump, in combination, a housing having an oil reservoir chamber in the upper portion thereof and having a central bore in the lower portion extending from the reservoir chamber to the base of the housing, a barrel retainer in the upper end of the bore adjacent the reservoir chamber, a member in the bore adjacent the base and providing a pumping chamber, a flexible bellows located within the pumping chamber, said bellows having a closed bottom end and having an open top end, an upper bellows support located in the bore above said member and to which the open top end of the bellows is hermetically sealed, means below the barrel retainer and providing a connecting passage between the barrel retainer and the open top end of the bellows, reciprocating means having location within the barrel retainer and operative for subjecting the oil in the connecting passage and within the bellows to hydraulic pulsations to cause alternate expansion and contraction of the bellows and which comprise the pumping strokes thereof, a valved inlet for the pumping chamber, a valved outlet for the pumping chamber, said housing providing a vent opening for the pumping chamber, and a manually adjustable venting valve assembly for normally closing said vent opening but which is retractible as regards the opening to permit the venting of air, gas and vapors from the pumping chamber.

6. A pump as defined by claim 5, additionally including a return spring for the bellows, said spring being confined between the base of the pumping chamber and the bottom end of the bellows, whereby the bellows is yieldingly biased upwardly toward its contracted position, and wherein the venting valve assembly includes a bleeder tube having adjustable threaded relation with the housing, and a valve member loosely fixed to the end of the bleeder tube adjacent the vent opening by a ball and socket connection.

7. In a pump, in combination, a housing having an oil reservoir chamber in the upper portion thereof and having a central bore in the lower portion extending from the reservoir chamber to the base of the housing, a barrel retainer in the upper end of the bore adjacent the reservoir chamber, a member in the bore adjacent the base and providing a pumping chamber, a flexible bellows located within the pumping chamber, said bellows having a closed bottom end and having an open top end, an upper bellows support located within the bore and in contact with said member and to which the open top end of the bellows is hermetically sealed, means in the bore located below the barrel retainer and providing a connecting passage between the barrel retainer and the open top end of the bellows, a barrel positioned by the barrel retainer within the reservoir chamber, a metering plunger adapted to reciprocate within the barrel for subjecting the oil in the connecting passage and within the bellows to hydraulic pulsations to cause alternate expansion and contraction of the bellows and which comprise the pumping strokes thereof, a valved inlet for the pumping chamber, a valved outlet for the pumping chamber, said housing providing a vent opening for the pumping chamber, a bleeder tube adjustably threaded to the housing, a valve member loosely fixed to the end of the bleeder tube adjacent the vent opening, said valve member normally closing the vent opening but being retractible as regards the opening to permit the venting of air, gas and vapors from the pumping chamber, and other means operatively associated with the metering plunger for adjusting the effective pumping strokes thereof to vary the magnitude of the hydraulic pulsations and thus the discharge rate of the pump.

8. In a pump, in combination, an elongated housing having an oil reservoir chamber in the upper portion thereof and having a central bore in the lower portion extending from the reservoir chamber to the base of the housing, a barrel retainer in the upper end of the bore adjacent the reservoir chamber, a member in the bore adjacent the base and providing a pumping chamber, a flexible bellows located within the pumping chamber, said bellows having a closed bottom end and having an open top end, an upper bellows support located in the bore above said member and to which the open top end of the bellows is hermetically sealed, a spacing member in the bore below the barrel retainer and providing a connecting passage between the barrel retainer and the open top end of the bellows, reciprocating means having location within the barrel retainer and operative for subjecting the oil in the passage and within the bellows to hydraulic pulsations to cause alternate expansion and contraction of the bellows and which comprise the pumping strokes thereof, an inlet for the pumping chamber, an outlet for the pumping chamber, and said inlet and outlet each incorporating a one-way valve assembly including a base having a vertical passage and providing a flat top valve seating surface, a cage having a vertical passage and being supported on the flat top surface of the base, a valve member in the form of a thin flat disc seating on the flat top surface of the base to close the passage therein and being confined within a recess in the cage which limits lifting movement of the valve member in an opening direction, whereby when the valve member is open liquid can flow upwardly through both passages.

9. In a pump, in combination, an elongated housing having an oil reservoir chamber in the upper portion thereof and having a central bore in the lower portion extending from the reservoir chamber to the base of the housing, a barrel retainer in the upper end of the bore adjacent the reservoir chamber, a member in the bore adjacent the base and providing a pumping chamber, a flexible bellows located within the pumping chamber, said bellows having a closed bottom end and having an open top end, an upper bellows support located in the bore above said member and to which the open top end of the bellows is hermetically sealed, a spacing member in the bore below the barrel retainer and providing a connecting passage between the barrel retainer and the open top end of the bellows, a barrel positioned by the barrel retainer within the reservoir chamber, a metering plunger adapted to reciprocate within the barrel for subjecting the oil in the passage and within the bellows to hydraulic pulsations to cause alternate expansion and contraction of the bellows and which comprise the pumping strokes thereof, a valved inlet for the pumping chamber, a valved outlet for the pumping chamber, a valve seat member located in the spacing member in surrounding relation with the passage therein, said seat member providing an annular valve seat directed toward the open end of the bellows, a downhill valve in associated relation with said valve seat and having an opening movement toward the bellows, and resilient means retaining the downhill valve in contact with its said valve seat.

10. A pump as defined by claim 9, additionally including a bellows guide located within the bellows and extending longitudinally thereof, said bellows guide having a length and being so constructed and arranged as to limit movement of the bellows in a contracting direction, and a return spring for the bellows, said return spring being located between the base of the pumping chamber and the bottom of the bellows, whereby the bellows is yieldingly biased upwardly into its contracted position as determined by the length of the bellows guide.

11. In a pump, in combination, an elongated housing having an oil reservoir chamber in the upper portion thereof and having a central bore in the lower portion extending from the reservoir chamber to the base of the housing, a barrel retainer in the upper end of the bore adjacent the reservoir chamber, a member in the bore adjacent the base and providing a pumping chamber, a flexible bellows located within the pumping chamber, said bellows having a closed bottom end and having an open top end, an upper bellows support located in the bore above said member and to which the open top end of the bellows is hermetically sealed, a spacing member in the bore below the barrel retainer and providing a connecting passage between the barrel retainer and the open top end of the bellows, reciprocating means having location within the barrel retainer and operative for subjecting the oil in the passage and within the bellows to hydraulic pulsations to cause alternate expansion and contraction of the bellows and which comprise the pumping strokes thereof, a valved inlet for the pumping chamber, a valved outlet for the pumping chamber, an annular valve seat member located in the spacing member in surrounding relation with the passage therein, a bellows stem fixed to the bottom end of the bellows and extending longitudinally thereof to terminate above the open end, and a downhill valve formed on the terminal end of the bellows stem and positioned for coaction with the valve seat member, said downhill valve having opening movement in a direction toward the bellows, whereby said valve operates in synchronism with the hydraulic pulsations to maintain a balancing of the pressures interiorly and exteriorly of the bellows.

12. In a pump, the combination with a housing having a pumping chamber therein, an inlet for said chamber, an outlet for said chamber, a unitary valve assembly for the inlet and outlet respectively, a reservoir chamber provided by the housing and located in spaced relation to the pumping chamber, a passage extending between said chambers, a flexible pumping element in the pumping chamber and having its periphery hermetically sealed to the housing walls in surrounding relation with the passage, said pumping element being constructed and arranged to partition the pumping chamber into two compartments, one compartment connecting through the passage with the reservoir chamber, the other compartment communicating with the unitary valve assembly for the inlet and outlet respectively, the walls of said passage having ports for connecting the passage with the reservoir chamber, reciprocating means operating within the passage and in associated relation with said ports for subjecting the fluid therein to hydraulic pulsations to pulsate the pumping element, whereby as the volumetric capacity of the pumping chamber is varied a liquid can be drawn through the valved inlet and discharged through the valved outlet, each said unitary valve assembly including a base having a center passage and which provides a flat valve seating top surface, a cage also having a center passage and which is supported on the flat top surface of the base with the passages in alignment, and a valve member comprising a flat disc having location within a recess provided by the cage, said valve member having seating contact on the flat top surface of the base to close the valve assembly, and said valve member lifting to an extent as permitted by the recess to open the valve assembly permitting a liquid to flow through the aligned passages.

13. A pump as defined by claim 12, wherein said reciprocating means is provided with a helical formation adjacent its base for coaction with the ports, whereby the the effective pumping strokes of the reciprocating means can be varied to vary the magnitude of the hydraulic pulsations and thus the discharge rate of the pump.

14. A pump as defined by claim 12, wherein the housing is provided with a fluid escape port in the walls of the passage and which is located closer to the pumping chamber than the ports that connect the passage with the reservoir chamber, and a spring-loaded valve normally maintaining the escape port closed but opening to permit escape of fluid from the passage when the pressure thereof exceeds a maximum as determined by the spring-loading on the valve.

15. In a pump, the combination with a housing having a pumping chamber therein, an inlet for said chamber, an outlet for the chamber, a unitary valve assembly for the inlet and outlet respectively, a reservoir chamber provided by the housing and located in spaced relation to the pumping chamber, a passage extending between the said chambers, a pumping element within the pumping chamber and having its periphery hermetically sealed to the housing walls in surrounding relation with the passage, said pumping element being constructed and arranged to partition the pumping chamber into two compartments, one compartment connecting through the passage with the reservoir chamber, the other compartment communicating with the unitary valve assembly for the inlet and outlet respectively, reciprocating means operating within the passage for subjecting the fluid therein to hydraulic pulsations to pulsate the pumping element, whereby as the volumetric capacity of the pumping chamber is varied a liquid can be drawn through the valved inlet and discharged through the valved outlet, said housing providing a vent opening for the pumping chamber, a venting valve for closing said vent opening, and a bleeder tube having an adjustable threaded relation with the housing, said tube having a loose ball and socket connection with the venting valve whereby when the valve is open it will permit escape of air, gas and vapor from the pumping chamber on a discharge stroke of the pumping element and will automatically close on a suction stroke of the pumping element to prevent the entrance of atmospheric air to within the pumping chamber.

16. In a pump of the character described, a pump housing providing a reservoir chamber for containing a fluid, a second chamber also provided by the pump housing, said second chamber having communicating relation with said reservoir chamber by means of a connecting passageway, a flexible pumping element in the second chamber and arranged to partition the second chamber into two compartments, one of said compartments having an inlet and an outlet, the other compartment connecting with the reservoir chamber through the said passageway, means in associated relation with the reservoir chamber and passageway for pulsating the flexible pumping element by producing pulsating flows of said fluid within the passageway, a valve assembly for the inlet and outlet respectively, each valve assembly including a base having a center passage and providing a flat top surface, a cage also having a center passage and which is supported on the flat top surface of the base with the passages in alignment, a valve member comprising a flat disc having location within a recess provided by the cage, said valve member having seating contact on the flat top surface of the base to close the valve assembly, said valve member lifting to an extent as permitted by the recess to open the valve assembly permitting a liquid to flow through the aligned passages, and a spring-loaded discharge valve for the said outlet and having a location beyond the valve assembly thereof considering the direction of liquid flow through the outlet.

17. A pump as defined by claim 16, additionally including a downhill valve within the passageway, said downhill valve including a valve seat in surrounding relation with the passageway and a valve adapted to have opening and closing action with said seat to thereby control the flow of fluid into and from the second chamber to maintain a balanced condition of the hydraulic pressures within the two compartments.

18. In a pump, the combination with a housing providing a reservoir chamber in the upper portion thereof and said housing having a central bore extending from the reservoir chamber to the base of the housing, a member located within the bore in the base thereof and providing a pumping chamber open at its top end, a flexible pumping element within the pumping chamber, means sealing the pumping element at its periphery to the said member and in a manner to close the open top end of the pumping chamber, a plunger pumping assembly located in the reservoir chamber in alignment with said bore and operative for producing hydraulic pulsations to cause the element to alternately expand and contract, a valved inlet in communicating relation with the pumping chamber, a valved outlet also in communicating relation with the pumping chamber, and a plate secured to the base of the housing for locking the member within the bore, whereby the said member, the flexible pumping element and the sealing means therefor comprise a unitary assembly complete in itself and which can be inserted and removed from the bore as a unit.

References Cited in the file of this patent
UNITED STATES PATENTS

| | | |
|---|---|---|
| 693,479 | Worthington | Feb. 18, 1902 |
| 999,832 | Milburn | Aug. 8, 1911 |
| 1,022,556 | Johnson et al. | Apr. 9, 1912 |
| 1,062,375 | Tyson | May 20, 1913 |
| 1,627,257 | Stevens | May 3, 1927 |
| 1,696,825 | White | Dec. 25, 1928 |
| 1,915,833 | Mantle | June 27, 1933 |
| 2,301,407 | Houser et al. | Nov. 10, 1942 |
| 2,303,597 | Adelson | Dec. 1, 1942 |
| 2,308,974 | Harper | Jan. 19, 1943 |
| 2,530,128 | Mashinter | Nov. 14, 1950 |
| 2,559,364 | Mashinter | July 3, 1951 |
| 2,625,108 | Logan | Jan. 13, 1953 |
| 2,630,761 | Mashinter | Mar. 10, 1953 |
| 2,630,762 | Mashinter | Mar. 10, 1953 |
| 2,636,439 | Mashinter | Apr. 28, 1953 |
| 2,691,943 | Wilson | Oct. 19, 1954 |

FOREIGN PATENTS

| | | |
|---|---|---|
| 637,589 | Great Britain | May 24, 1950 |